United States Patent
Kwon et al.

(10) Patent No.: US 9,489,117 B2
(45) Date of Patent: Nov. 8, 2016

(54) VIDEO APPARATUS PROVIDING A USER INTERFACE (UI) AND METHOD THEREOF

(75) Inventors: Giang-yoon Kwon, Guri-si (KR); Keum-koo Lee, Seongnam-si (KR); Jung-chul Park, Incheon (KR); Yong-jin So, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1419 days.

(21) Appl. No.: 12/131,385

(22) Filed: Jun. 2, 2008

(65) Prior Publication Data

US 2009/0178000 A1    Jul. 9, 2009

(30) Foreign Application Priority Data

Jan. 7, 2008 (KR) .................... 2008-1939

(51) Int. Cl.
| | |
|---|---|
| G06F 3/048 | (2013.01) |
| G06F 3/0485 | (2013.01) |
| G06F 3/0481 | (2013.01) |
| G06F 3/0482 | (2013.01) |
| H04N 5/445 | (2011.01) |
| H04N 21/482 | (2011.01) |
| H04N 21/431 | (2011.01) |

(52) U.S. Cl.
CPC .......... *G06F 3/0485* (2013.01); *G06F 3/0481* (2013.01); *G06F 3/0482* (2013.01); *H04N 5/44543* (2013.01); *H04N 5/44591* (2013.01); *H04N 21/4312* (2013.01); *H04N 21/482* (2013.01)

(58) Field of Classification Search
CPC ................. G06F 3/0485; H04N 5/44591
USPC ................................. 715/854, 855
See application file for complete search history.

(56) References Cited

U.S. PATENT DOCUMENTS

| 6,175,362 | B1 | 1/2001 | Harms et al. | |
|---|---|---|---|---|
| 6,285,366 | B1* | 9/2001 | Ng et al. | 715/853 |
| 7,334,195 | B2* | 2/2008 | Gemmell et al. | 715/841 |
| 7,458,037 | B2* | 11/2008 | Fuchs et al. | 715/855 |
| 2007/0136669 | A1 | 6/2007 | Kwon et al. | |
| 2007/0150840 | A1* | 6/2007 | Olcott et al. | 715/854 |

FOREIGN PATENT DOCUMENTS

| JP | 2002-312397 | 10/2002 |
|---|---|---|
| KR | 10-0340254 B1 | 6/2002 |
| KR | 2005-121356 | 12/2005 |
| KR | 2006-3606 | 1/2006 |
| KR | 10-2007-0058265 A | 6/2007 |

OTHER PUBLICATIONS

Search Report and Written Opinion issued in International Application No. PCT/KR2008/003336 on Aug. 28, 2008.

* cited by examiner

*Primary Examiner* — Andrey Belousov
(74) *Attorney, Agent, or Firm* — Jefferson IP Law, LLP

(57) ABSTRACT

A video apparatus includes a receiving unit to receive a selection command for at least one item from among a plurality of items, and a control unit to provide quantity information about alternative items to the selected item when at least one item is selected. A user is provided with the quantity information about the alternative items placed alongside a currently selected item, and thus able to intuitively determine the distribution of the items and a direction in which he may choose to view or select the items. As a result, the user is able to navigate through a plurality of items with convenience. The user is also provided with the information about the items currently not displayed on a display, and thus does not feel inconvenience caused by the limited size of the display screen.

14 Claims, 5 Drawing Sheets

VIDEO APPARATUS PROVIDING A USER INTERFACE (UI) AND METHOD THEREOF

CROSS-REFERENCE TO RELATED APPLICATIONS

This application claims the benefit of Korean Application No. 2008-1939, filed Jan. 7, 2008 in the Korean Intellectual Property Office, the disclosure of which is incorporated herein by reference.

BACKGROUND OF THE INVENTION

1. Field of the Invention

Aspects of the present invention relate to a video apparatus providing a user interface (UI) and a UI providing method thereof. More particularly, aspects of the present invention relate to a video apparatus providing a UI for efficiently navigating content, and a UI providing method thereof.

2. Description of the Related Art

As digital technology has rapidly developed and has been applied to digital electronic devices, ensuring sufficient storage space for digital contents, the diversity and quantity of content used in digital electronic devices have been expanding exponentially. Recently, due to the widespread distribution of portable electronic devices, users have had increasing access to many kinds of content.

Although the quantity of content has increased, the size of displays has not matched the quantity of content due to limitations in display size.

Therefore, since it is difficult to display all of the content used in a digital electronic device on a display of a limited size, the user cannot concurrently obtain information regarding content which is currently selected, together with information regarding the location and quantity of non-selected content.

The broader the selection of content that the user has, the lower the quantity of content that the display can show at one time. Therefore, there is a need for methods for the user to navigate digital content more conveniently.

SUMMARY OF THE INVENTION

Several aspects and example embodiments of the present invention provide a video apparatus that provides a user with quantity information regarding alternative options to a selected content item used in a video apparatus so that the user can intuitively recognize the distribution of the content items.

Additional aspects and/or advantages of the invention will be set forth in part in the description which follows and, in part, will be obvious from the description, or may be learned by practice of the invention.

According to an example embodiment of the present invention, a video apparatus includes a receiving unit to receive a selection command for at least one item from among a plurality of items; and a control unit to provide quantity information about alternative items to the selected item when at least one item is selected.

According to an aspect of the present invention, when the at least one item is selected, the control unit highlights the selected item and concurrently provides the quantity information about the alternative items.

According to an aspect of the present invention, when the at least one item is selected, the control unit adds at least one graphic alongside the selected item, and provides the quantity information about the alternative items by using the added graphic.

According to an aspect of the present invention, the control unit provides the quantity information about the alternative items by manipulating at least one of size, color, brightness, and degree of transparency of the added graphic.

According to an aspect of the present invention, the control unit causes a numeric figure to be displayed on the added graphic to indicate the quantity information about the alternative items.

According to an aspect of the present invention, the control unit provides information about the location of the alternative items using directional information included in the added graphic.

According to an aspect of the present invention, the control unit causes an indicative line to be displayed on the added graphic to provide information about the location of the alternative items.

According to an aspect of the present invention, the quantity information about the alternative items includes at least one of the number of alternative items, and capacity of content or a menu indicated by the alternative items.

According to an aspect of the present invention, the at least one item includes a content item or a menu item, and the alternative items include items existing in a non-display area, among items of the menu to which the selected item belongs.

According to an another example embodiment of the present invention, there is provided a method for providing a user interface (UI) including: receiving a selection command for at least one item from among a plurality of items; and providing quantity information about alternative items to the selected item when at least one item is selected.

According to an aspect of the present invention, the method further includes highlighting the selected item concurrently with the providing of the quantity information about the alternative items.

According to an aspect of the present invention, the providing of quantity information is carried out by adding at least one graphic alongside the selected item that provides a graphical representation of the quantity information about the alternative items.

According to an aspect of the present invention, the providing of the quantity information about the alternative items includes manipulating at least one of size, color, brightness, and degree of transparency of the added graphic.

According to an aspect of the present invention, the providing of quantity information may further include causing a numeric figure to be displayed on the added graphic to indicate the quantity of alternative items.

According to an aspect of the present invention, the providing of quantity information includes providing information about the location of the alternative items using directional information included in the added graphic.

According to an aspect of the present invention, the method may further include causing an indicative line to be displayed on the added graphic to indicate the location of the alternative items.

According to an aspect of the present invention, the quantity information about the alternative items includes at least one of the number of alternative items, and capacity of content or a menu indicated by the alternative items.

According to an aspect of the present invention, the at least one item includes a content item or a menu item, and the alternative items include items existing in a non-display area, among with items of the menu to which the selected item belongs.

According to another embodiment of the present invention, there is provided a video apparatus comprising a graphic user interface generating unit to generate a plurality of selectable items; a receiving unit to receive a selection command for a selected item from among the plurality of selectable items; a display unit to display one or more selectable items of the plurality of selectable items, including the selected item; and a control unit to control the generating of the plurality of selectable items and to control the display unit to display quantity information about non-selected items from among the plurality of selectable items by providing at least one graphic indicator alongside the selected item, wherein the quantity information about the non-selected items is represented by a size, color, brightness, or degree of transparency of the at least one graphic indicator or by a numeric figure added to the graphic indicator and wherein the at least one graphic indicator indicates one or more directions toward which a user can navigate to locate non-selected items that are not displayed concurrently with the selected item and indicates a relative quantity, an exact number or a file size of the non-selected items in each of the one or more directions.

According to another embodiment of the present invention, there is provided a method for providing a user interface (UI), the method comprising receiving a selection command for at least one item from among a plurality of items; and providing quantity information about alternative items to a selected item when at least one item is selected, by providing at least one graphic indicator alongside the selected item, wherein the quantity information about the alternative items is represented by a size, color, brightness, or degree of transparency of the at least one graphic indicator or by a numeric figure included with the graphic indicator and wherein the at least one graphic indicator indicates one or more directions toward which a user can navigate to locate alternative items that are not displayed concurrently with the selected item and indicates a relative number, an exact quantity or a file size of the alternative items in each of the one or more directions In addition to the example embodiments and aspects as described above, further aspects and embodiments will be apparent by reference to the drawings and by study of the following descriptions.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE EMBODIMENTS

Figure 1:
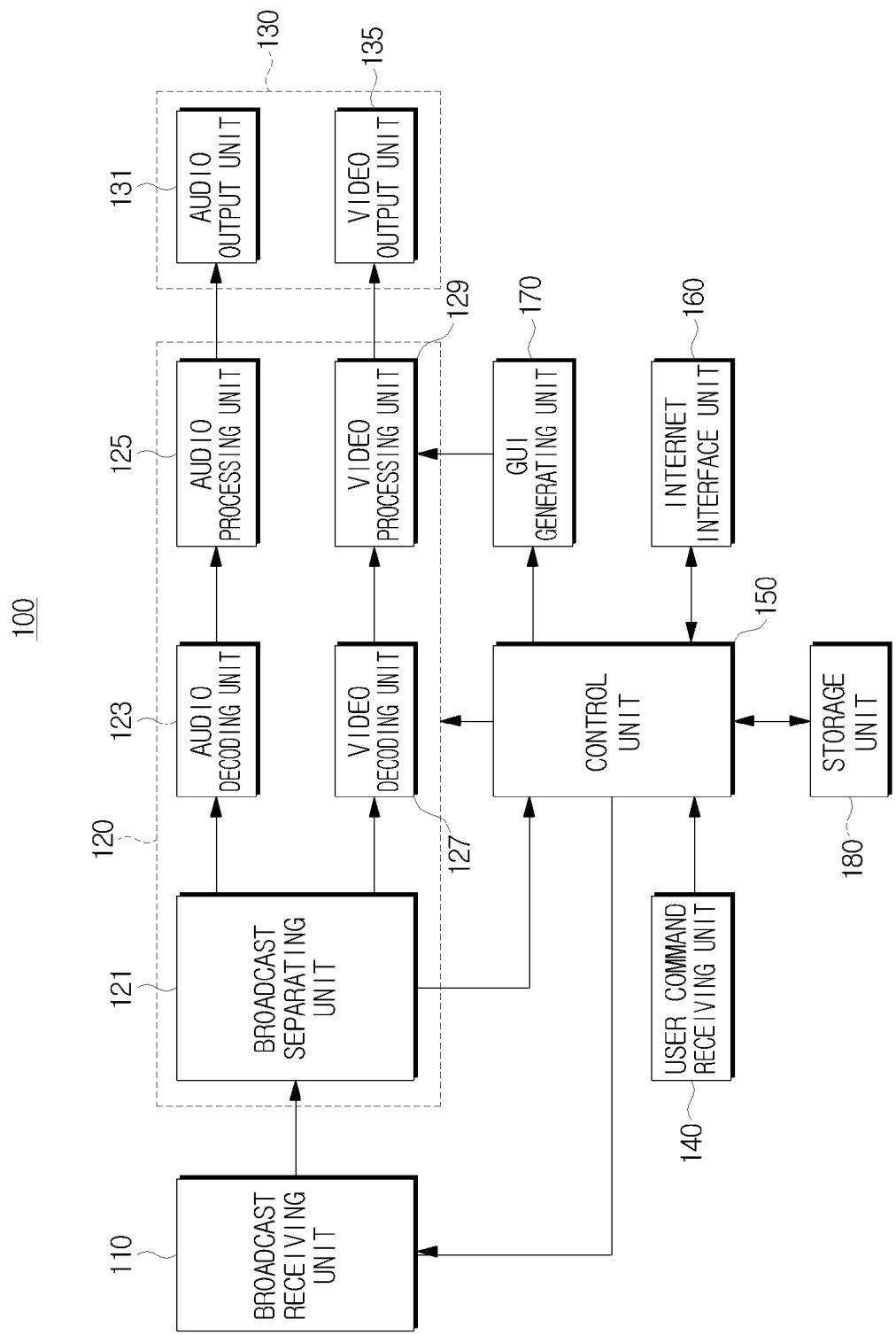
FIG. 1 is a block diagram of a digital television according to an example embodiment of the present invention.

Reference will now be made in detail to the present embodiments of the present invention, examples of which are illustrated in the accompanying drawings, wherein like reference numerals refer to the like elements throughout. The embodiments are described below in order to explain aspects of the present invention by referring to the figures.

FIG. 1 is a block diagram of a digital television according to an embodiment of the present invention. The digital television provides the user with digital broadcast programs, and data broadcast services, which include one-way and two-way services.

As shown in FIG. 1, the digital television includes a broadcast receiving unit 110, a broadcast processing unit 120, an output unit 130, a user command receiving unit 140, a control unit 150, an Internet interface unit 160, a graphical user interface (GUI) generating unit 170, and a storage unit 180.

The broadcast receiving unit 110 tunes to and demodulates broadcast signals received by wire (such as, for example, cable) or wirelessly.

The image processing unit 120 includes a broadcast separating unit 121, an audio decoding unit 123, an audio processing unit 125, a video decoding unit 127, and a video processing unit 129.

The broadcast separating unit 121 separates a video signal, an audio signal, and data broadcast signal from a broadcast signal output from the broadcast receiving unit 110.

The video signal and the audio signal are transmitted to the video processing unit 129 and the audio processing unit 125, respectively, and are thereby used to provide a digital broadcast program.

The data broadcast signal is transmitted to the control unit 150 and is thereby used to provide a data broadcast service.

The audio decoding unit 123 decodes the audio signal output from the broadcast separation unit 121, so that a decompressed audio signal is output.

The audio processing unit 125 converts the decoded audio signal into a format that can be output to a speaker.

The video decoding unit 127 decodes the video signal output from the broadcast separation unit 121 so that a decompressed video signal can be output.

The video processing unit 129 converts the decoded video signal into a format that can be output to a display by performing color signal processing and scaling.

The Internet interface unit 160 enables two-way data broadcast services through an external Internet communication network by transmitting a user's request/intention to a server that is connected to the network and receiving a response to the user's request/intention from the server. The user receives the response to the user's request/intention as an Internet signal, and the Internet signal contains various kinds of information or content that the user has requested.

For example, if the user requests information regarding an actor of a drama that is currently being viewed through the Internet communication network, the user may receive various kinds of information regarding the actor, such as his date of birth, filmography, academic career, debut year, and awards received, etc., from the server.

The Internet signal received through the Internet communication network is transmitted to the control unit 150 and used to provide a two-way broadcast service.

The output unit 130 provides the user with video and audio corresponding to the video and audio signals output from the broadcast processing unit 120. The output unit 130 includes an audio output unit 131 and a video output unit 135.

The audio output unit 131 outputs the audio signal output from the audio processing unit 125 to a speaker or to a sound system of an external display (for example, an external television) connected through an external output terminal.

The video output unit 135 outputs the video signal output from the video processing unit 129 to the display or an external display (for example, an external television) connected through the external output terminal.

The storage unit 180 stores data and programs that are necessary to operate the digital television, and may be implemented as a memory device, a hard disk drive (HDD), or the like.

The user command receiving unit 140 receives user commands through a remote control (not shown) and transmits the user commands to the control unit 150. The control unit 150 controls the overall operation of the digital television according to the user commands.

In more detail, the control unit 150 controls the operations of the broadcast receiving unit 110 and broadcast processing unit 120 in order to provide the user with digital broadcast programs. Additionally, the control unit 150 provides the user with data broadcast services using the data broadcast signal received from the broadcast separation unit 121 and also provides the user with Internet services using the Internet signal received via the Internet interface unit 160.

The GUI generating unit 170 generates a GUI to be displayed on the display, using the data broadcast signal and Internet signal output from the control unit 150.

The GUI generated by the GUI generating unit 170 is transferred to the video processing unit 129, and is then added to video to be displayed on the display. This operation is referred to as on-screen display (OSD) processing.

The GUI generating unit 170 generates various items represented by text, symbols, figures or graphics, using the data broadcast signal and Internet signal output from the control unit 150, and transfers the generated items to the video processing unit 129. The video processing unit 129 displays the received items on an external display (not illustrated).

The items generated by the GUI generating unit 170 may be content items contained in the data broadcast signal or Internet signal, or may be menu items to which the content items belong.

In particular, the GUI generating unit 170 generates items that the user can select. If a selection command for a specific item is received through the user command receiving unit 140, the controller 150 may control the GUI generating unit 170 to highlight the item selected by the user.

If a selection command for an item is received, the controller 150 causes the GUI generating unit 170 to display a graphic alongside the selected item to indicate quantity information about alternative options. As used herein, the term "alongside the selected item" is not limiting and refers to any area adjoining or in the vicinity of the selected item, such as, for example, immediately to the left or right of the selected item, above or below the selected item or at a diagonal to the selected item. Typically, if non-selected items as well as selected items are shown on a display, the graphics alongside the selected item will be placed such that it is clear that the graphics are associated with the selected item and not with a non-selected item.

Figure 2:
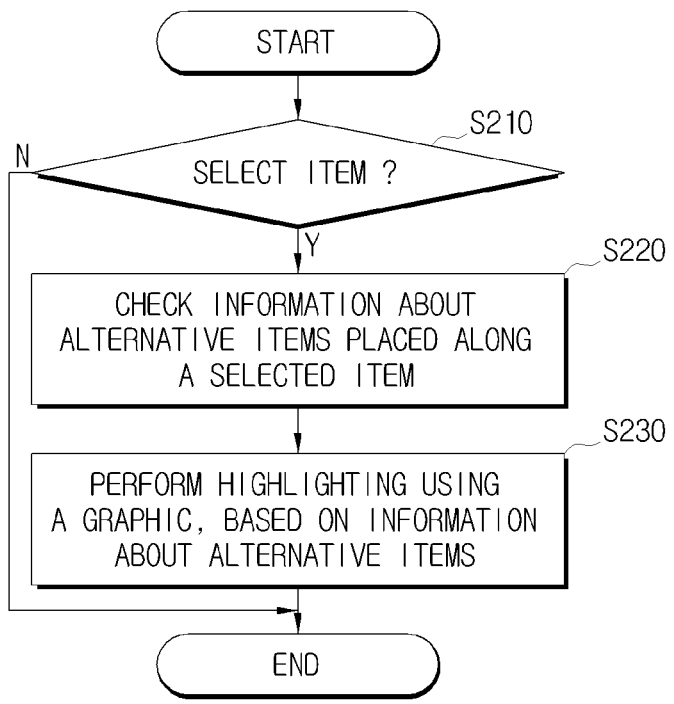
FIG. 2 is a flowchart of a UI providing method according to an example embodiment of the present invention.

FIG. 2 is a flowchart of a user interface (UI) providing method according to an embodiment of the present invention. Hereinafter, a process for providing quantity information about the alternative options to the selected item will be described with reference to FIGS. 3 to 6, prior to describing the method of FIG. 2.

Figure 3:
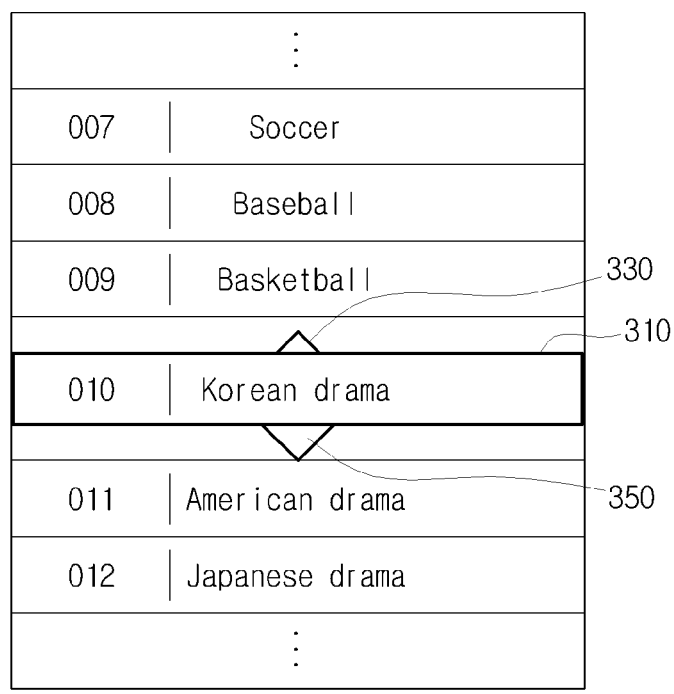
FIG. 3 shows a display having a plurality of items displayed vertically in a row.

FIG. 3 shows a plurality of items that are displayed vertically in a row on a display 300. The plurality of items, such as soccer, baseball, basketball or the like, are displayed vertically on a display 300, as shown in FIG. 3. The items may be content items or menu items. If a plurality of content items is displayed on the display 300, the user may select one item from among the displayed items and view the selected content item. Alternatively, if a plurality of menu items is displayed on the display 300, the user may select one item from among the displayed menu items, and request a sub-menu item or a content item of the selected menu item.

The control unit 150 controls the GUI generating unit 170 to generate items described above using the data broadcast signal and Internet signal. In this example embodiment, items are represented by numbers such as "001" or the like together with headings such as "soccer" or the like. Alternatively, the item may be represented using symbols, figures or graphics.

For example, if a selection command for an item "010/ Korean drama" is received through the user command receiving unit 140, the GUI generating unit 170 may add a highlighting 310, an up arrow graphic 330 and a down arrow graphic 350 along with the currently selected item "010/ Korean drama".

The term "highlighting" refers to a graphic to indicate the currently selected item. Although the highlighting 310 is displayed as an outline of a box in the exemplary embodiment shown in FIG. 3, the highlighting may be displayed in various manners. For example, the selected item may be displayed in a different color from other items, or may be displayed three dimensionally, so that the selected item may be distinguished from other items. The highlighting 310 shown in FIG. 3 may be replaced by any indicator that distinguishes the selected item from other items.

The up arrow graphic 330 is used to indicate how many other items are arranged above the current item, in a menu to which the currently selected item belongs. The up arrow graphic 330 is also used to indicate a direction in which the highlighting 310 is able to move from the currently selected item to the alternative options in the same menu to which the currently selected item belongs. The up arrow graphic 330 has a substantially triangular form, to indicate that there are other items above the selected item and that the highlighting 310 is able to move upward in order to select the items other than the selected item.

The down arrow graphic 350 is also used to indicate a direction in which the highlighting 310 is able to move from the currently selected item to other items in the menu to which the currently selected item belongs. The down arrow graphic 350 also has a substantially triangular form, to indicate that there are alternative options below the currently selected item and that the highlighting 310 is able to move downward in order to select the alternative items.

The terms 'alternative options' or 'alternative items' refer to items that are not currently selected and that are contained in the same menu as the currently selected item. The alternative options or alternative items may or may not be displayed on the display concurrently with the selected item. For example, if there is not enough room on a display to show all of the alternative items, some of the alternative items will be displayed and some of the alternative items will not be displayed at a given time.

The up arrow graphic 330 and down arrow graphic 350 also provide quantity information about alternative items according to the relative sizes of the up arrow graphic 330 and down arrow graphic 350. Accordingly, the user may estimate the number of alternative items that are available in each direction by comparing the sizes of the triangular forms. Alternatively, the number of alternative items may be indicated by graphics added to the selected item.

In this example embodiment of the present invention shown in FIG. 3, the up arrow graphic 330 is smaller than the down arrow graphic 350, so it is possible to intuitively know that the number of alternative items above the currently selected item, namely "010/Korean drama", is less than the number of alternative items below the item "Korean drama". For example, if there are nine items including alternative items together with items in a non-display area above the currently selected item "010/Korean drama", there are at least ten items in total including alternative items together with items in a non-display area below the currently selected item "010/Korean drama".

If a command to move from the currently selected item to items above the currently selected item is received through the user command receiving unit 140, the GUI generating unit 170 may move the highlighting 310, up arrow graphic 330 and down arrow graphic 350 that have been displayed along with the item "010/Korean drama" to indicate the item "009/basketball" placed above the item "010/Korean drama." When this is done, the item "010/Korean drama" is no longer highlighted.

In this case, as the number of alternative items positioned above the currently selected item "009 | basketball" decreases, and the number of alternative items positioned below the currently selected item "009 | basketball" increases, the up arrow graphic 330 decreases in size and the down arrow graphic 350 increases in size.

As described above, the GUI generating unit 170 adds a graphic alongside the currently selected item, and thereby provides quantity information about alternative items through the display, based on the size of the added graphic.

Figure 4:
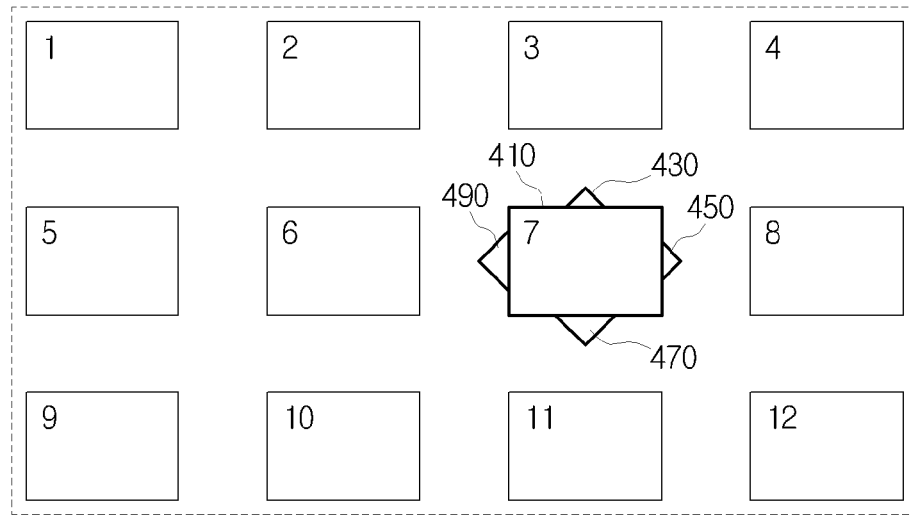
FIG. 4 shows a display having a plurality of items displayed in the form of a lattice.
Figure 5A:
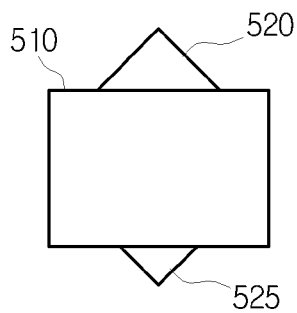
FIGS. 5A to 5E show alternative methods to display quantity information regarding alternative options to a selected item.
Figure 5B:
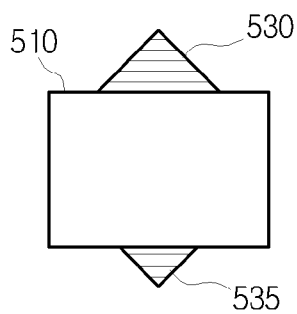
Figure 5C:
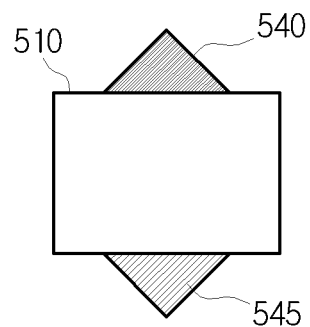
Figure 5D:
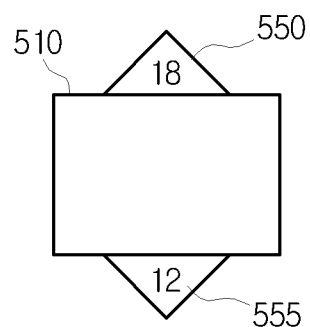
Figure 5E:
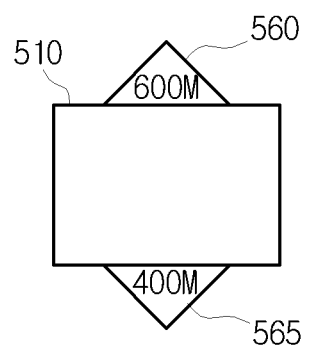
Figure 6:
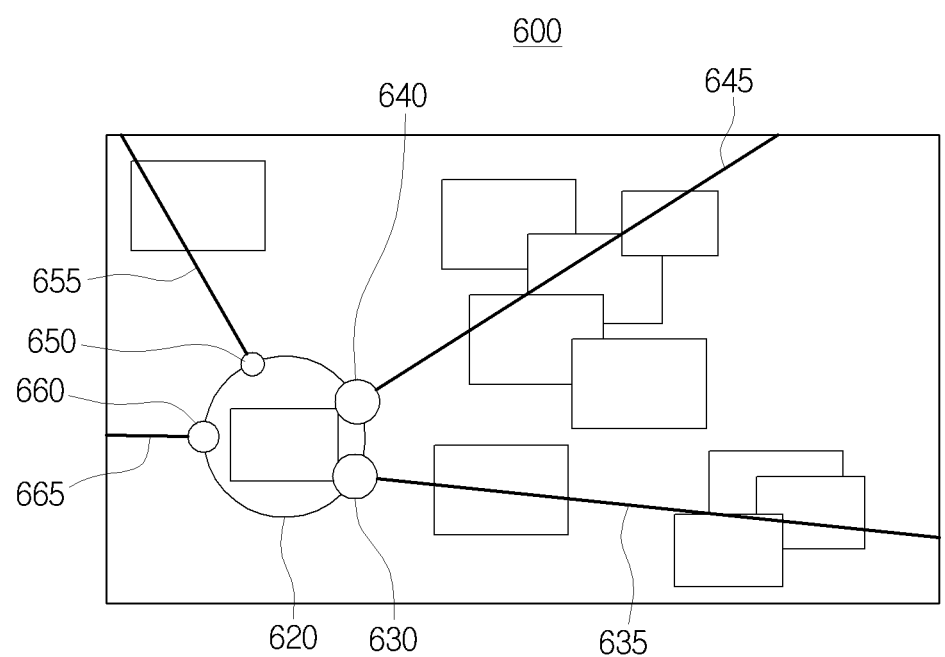
FIG. 6 shows a display providing quantity information regarding alternative options to a selected item using a graphical form other than a triangle.

FIGS. 4 to 6 show methods to display quantity information regarding alternative items using various forms.

FIG. 4 shows a plurality of items that are displayed in a lattice arrangement. An item '7' is selected from among items displayed on a display 400, and highlighting 410, an up arrow graphic 430, a right arrow graphic 450, a down arrow graphic 470, and a left arrow graphic 490 are added alongside the currently selected item '7.'

Since items are arranged in the form of a lattice, the up, right, down, and left arrow graphics 430, 450, 470, and 490 are added to four sides of the selected item '7,' to indicate that the highlighting 410 can be moved upward, rightward, downward, and leftward, to the alternative items. The triangular graphics may also be added to corners of the selected item, to indicate that the highlighting 410 can be moved to alternative items that are positioned at diagonals from a selected item, and to provide the quantity information on alternative items positioned at diagonals. If item '5' is selected instead of item '7,' there is no alternative item to the left of the currently selected item '5,' so the left arrow graphic 490 is not added. If item '7' is selected, the GUI generating unit 170 adds the highlighting 410 as an outline of the item to indicate the currently selected item. The up, right, down, and left arrow graphics 430, 450, 470, and 490 may be added to each of the four respective sides of the selected item '7' each in a triangular form.

The quantity of alternative items may be indicated similarly to the way quantity information is indicated in FIG. 3. In FIG. 4, the up and right arrow graphics 430 and 450 are smaller than the down and left arrow graphics 470 and 490, thereby representing that the number of alternative items above and to the right of the currently selected item is less than the number of alternative items below and to the left of the currently selected item. Accordingly, the user may gain information on the quantity and location of alternative items by viewing the graphics added to the currently selected item.

If a command to move upward is received through the user command receiving unit 140, the GUI generating unit 170 adds highlighting, a right arrow graphic, a down arrow graphic, and a left arrow graphic alongside item '3' placed above current item '7', and the highlighting 410, up arrow graphic 430, right arrow graphic 450, down arrow graphic 470, and left arrow graphic 490 of item '7' disappear from the display 400. Since there is no alternative item above item '3,' an up arrow graphic is not added to item '3.' As the selected item is moved upward from item '7' to item '3,' the sizes of the left and right arrow graphics do not vary, but the size of the down arrow graphic increases.

FIGS. 5A to 5E show other methods for displaying quantity information regarding alternative items. For convenience, only an item selected by a user is illustrated.

FIG. 5A shows a selected item wherein highlighting 510, an up arrow graphic 520, and a down arrow graphic 525 are added to the selected item. In the particular example of FIG. 5A, quantity information regarding alternative items is indicated using the size of triangular graphics, in the same manner as discussed with reference to FIG. 3. Thus, it is possible for the user to perceive that the number of alternative items placed above the selected item is more than that of alternative items below the selected item by perceiving the size of the up and down arrow graphics 520 and 522 alongside the selected item. If the user inputs a selection command for an item that is positioned above the currently selected item, an up arrow graphic smaller than the up arrow graphic 520 and a down arrow graphic larger than the down arrow graphic 525 are added alongside the newly selected item.

FIG. 5B shows a selected item wherein highlighting 510, an up arrow graphic 530, and a down arrow graphic 535 are added to the selected item and wherein quantity information regarding alternative items is indicated using partitions inside the triangular graphics in addition to changing the size of the triangular graphics. In the particular example shown in FIG. 5B, the up arrow graphic 530 is divided into six partitions, and the down arrow graphic 535 is divided into four partitions. Accordingly, it is possible for a user to determine that 60 percent of the alternative items are positioned above the currently selected item, and 40 percent are positioned below the selected item. For example, six alternative items may be positioned above the selected item, and four alternative items may be positioned below the selected item. If a user inputs a selection command for an item that is positioned immediately above the currently selected item, the up and down arrow graphics alongside the newly selected item are each divided into five partitions.

FIG. 5C shows a selected item wherein highlighting 510, an up arrow graphic 540, and a down arrow graphic 545 are added to the selected item and wherein quantity information regarding alternative items is indicated using the brightness of the triangular graphics instead of their size. In the particular example shown in FIG. 5C, the size of the up arrow graphic 540 is the same as that of the down arrow graphic 545, but the up arrow graphic 540 is darker than the down arrow graphic 545. Accordingly, it is possible for a user to recognize that there are more alternative items above the selected item than below the selected item, by perceiving the difference between the brightness of the up arrow graphic 540 and that of the down arrow graphic 545. If the user inputs a selection command for an item that is positioned above the currently selected item, an up arrow graphic brighter than the up arrow graphic 540, and a down arrow graphic darker than the down arrow graphic 525 are added alongside the newly selected item.

FIG. 5D shows a selected item wherein highlighting 510, an up arrow graphic 550, and a down arrow graphic 555 are added to the selected item and wherein quantity information regarding alternative items is indicated using numbers instead of the size of the triangular graphics. In the particular example shown if FIG. 5D, the size of the up arrow graphic 550 is the same as that of the down arrow graphic 555, but the up arrow graphic 550 contains the number '18' therein to represent the number of alternative items above the selected item, and the down arrow graphic 555 contains the number '12' therein to represent the number of alternative items below the selected item. Accordingly, it is possible for a user to determine the number of alternative items placed above and below the currently selected item by reading the numbers in the up and down arrow graphics 550 and 555. If the user inputs a selection command for an item that is positioned above the currently selected item, the up arrow graphic accompanying the newly selected item contains the number '17' therein to represent the number of alternative items above the selected item, and a down arrow graphic displays the number '13' therein to represent the number of alternative items below the newly selected item.

FIG. 5E shows an example in which quantity information regarding alternative items is indicated by displaying the file size of the alternative items. In the particular example shown in FIG. 5E, the up arrow graphic 560 and down arrow graphic 565 added to the selected item are both the same size. The up arrow graphic 560 bears a text '600M' therein to indicate a file size of the content or menu associated with the alternative items placed above the currently selected item, and the down arrow graphic 565 bears a text '400M' therein to indicate a file size of the content or menu associated with the alternative items placed below the currently selected item. The user views the text indicated in the graphic placed above and below the currently selected item to discern the file sizes of the alternative items placed above and below the currently selected item. If a user selects a different item, the up arrow graphic 560 and the down arrow graphic are adjusted accordingly. For example, if the user inputs a selection command for an item that is positioned above the currently selected item, the up arrow graphic 560 shows a decreased file size and the down arrow graphic 565 shows an increased file size with respect to the newly selected item.

FIG. 6 illustrates an example of quantity information regarding the alternative items being represented by other forms of graphics instead of by triangles. In the particular example shown in FIG. 6, the display 600 shows a plurality of rectangular items, in which highlighting 620 and graphics 630, 640, 650, 660 are used to indicate the quantity of the alternative items, and direction lines 635, 645, 655, 665 extending from the graphics 630, 640, 650, 660, are added alongside the item currently selected by the user.

While FIG. 4 shows items in a lattice arrangement, FIG. 6 shows items arranged in disorder according to an aspect of the present invention. Therefore, a more efficient navigation is provided, by displaying quantity information regarding alternative items at directions that have a high density of alternative items, rather than displaying the quantity information at up, down, right and left directions.

Accordingly, in the above example, the GUI generating unit 170 may provide a circular highlighting 620 added alongside the item currently selected by the user. The controller 150 determines the directions on the display 600 where there is higher number of alternative items, and the GUI generating unit 170 adds circular graphics 630, 640, 650, 660 to the determined directions. Since the circular graphics 630, 640, 650, 660 may not indicate the directions as accurately as in the lattice arrangement, direction lines 635, 645, 655, 665 may be added to the graphics 630, 640, 650, 660. Accordingly, the user intuitively knows how many items are placed in which directions from the currently selected item, based on the sizes and directions of the circular graphics 630, 640, 650, 660 added to the currently selected item.

While the circular graphics 630, 640, 650, 660 are employed in the particular example shown in FIG. 6, other forms of graphics, such as triangular forms as shown in FIGS. 3 to 5E, may be used. Alternatively, any other manner of adding the graphics may be implemented.

At operation S210, the controller 150 determines whether a user inputs a selection command regarding a specific item on the display through the user command receiving unit 140.

Returning to FIG. 2, at operation S210, if a user selection command is received regarding the specific item, at operation S220, the controller 150 checks the information about the alternative items, including the quantity and location of the alternative items.

At operation S230, the GUI generating unit 170 processes the selected item to be highlighted, using the information about the alternative items obtained by the controller 150. This highlighting process includes adding graphics, as discussed above in reference to FIGS. 3, 4, 5A, 5B, 5C, 5D, 5E and 6, to indicate quantity information of the alternative items.

While a DTV capable of two-way data broadcast reception has been explained above as an example of the present invention, it is to be understood that aspects of the present invention equally apply to a simple DTV, such as a process of selecting a broadcast program item using an electronic program guide (EPG).

Furthermore, aspects of the present invention are applicable not only to a DTV, but also to other devices that deal with digital content, such as PCs, set-top boxes, MP3, camcorders, DMPs, PMPs, gameplayers, or mobile phones.

Furthermore, while the items in the lattice arrangement are highlighted with a thick line, and the items in the non-lattice arrangement are highlighted with a circular line, it is to be understood that these manners of highlighting are provided only for illustrative purposes. Accordingly, other manners of highlighting may be applied, provided that the highlighting clearly indicates that the corresponding item is selected.

Furthermore, while the highlighting and graphics are shown as being implemented separately from each other, it is to be understood that this manner of display is only for illustrative purposes and that other manners of display may be used. For example, graphics alone may be applied to highlight a selected item.

Furthermore, while the graphics are shown as being provided in a triangular or circular configuration, it is to be understood that this manner of displaying the graphics is only for illustrative purpose and that aspects of the present invention are applicable to other types of graphics, provided that the graphics properly indicate the quantity information about the alternative items.

Furthermore, while the quantity information about the alternative items are indicated by applying the graphics of different sizes or brightness, or by applying the graphics that indicate a number or a file size of the alternative items, it is to be understood that these methods of displaying the quantity information are only for an illustrative purposes and that the quantity information about the alternative items may be indicated by adjusting other parameters, such as transparency, color, or depth.

As explained above, according to the example embodiments of the present invention, a user is provided with the quantity information about the alternative items placed alongside a currently selected item, and thus able to intuitively determine the distribution of the items and a direction in which he may choose to view or select the items. As a result, the user is able to navigate through a plurality of items with convenience. The user is also provided with the information about the items currently not displayed on a display, and thus does not feel inconvenience caused by the limited size of the display screen.

While there have been illustrated and described what are considered to be example embodiments of the present invention, it will be understood by those skilled in the art and as technology develops that various changes and modifications, may be made, and equivalents may be substituted for elements thereof without departing from the true scope of the present invention. Many modifications, permutations, additions and sub-combinations may be made to adapt the teachings of the present invention to a particular situation without departing from the scope thereof. Accordingly, it is intended, therefore, that the present invention not be limited to the various example embodiments disclosed, but that the present invention includes all embodiments falling within the scope of the appended claims.

What is claimed is:

1. An electronic apparatus comprising:
    a display;
    a receiving unit configured to receive a command from an external device; and
    a control unit configured to:
        control the display to provide a menu,
        if at least one item of the menu is selected by the command, control the display to provide a first graphical object indicating a quantity of a first set of items from remaining items on the menu and a second graphical object indicating a quantity of a second set of items from the remaining items on the menu, wherein a plurality of items associated with the menu include the selected at least one item and the remaining items,
    wherein the first graphical object is provided at a first position related to the first set of items and the second graphical object is provided at a second position related to the second set of items, and
    wherein, if the selected at least one item is changed, each of the first graphical object and the second graphical object is provided in a changed size at a changed position.

2. The electronic device of claim 1, wherein the control unit is further configured to add at least one graphic in a direction corresponding to an item which exists in at least one direction with reference to the selected at least one item.

3. The electronic device of claim 2, wherein the control unit is further configured to:
    when there is an item in a first direction with reference to the selected at least one item, add a first graphic in a direction corresponding to the first direction, and
    when there is an item in the first direction and a second direction, respectively, with reference to the selected at least one item, add the first graphic and a second graphic in a direction corresponding to the first direction and the second direction, respectively.

4. The electronic device of claim 1, wherein the control unit is further configured to provide the first graphical object using at least one of size, color, brightness, and degree of transparency and the second graphical object using at least one of size, color, brightness, and degree of transparency.

5. The electronic device of claim 1,
    wherein the first graphical object includes a numeric figure indicating the quantity of the first set of items, and
    wherein the second graphical object includes a numeric figure indicating the quantity of the second set of items.

6. The electronic device of claim 2,
    wherein the first graphical object includes an indicative line indicating a location of the first set of items, and
    wherein the second graphical object includes an indicative line indicating a location of the second set of items.

7. The electronic device of claim 1,
    wherein the quantity of the first set of items includes at least one of a number of the remaining items and a capacity of content of the menu indicated by the remaining items and
    wherein the quantity of the second set includes at least one of a number of the remaining items and the capacity of content of the menu indicated by the remaining items.

8. A method for providing a user interface (UI), the method comprising:
    receiving a command from an external device;
    displaying a menu, if at least one item of the menu is selected by the command; and
    displaying a first graphical object indicating a quantity of a first set of items from remaining items on the menu and a second graphical object indicating a quantity of a second set of items from the remaining items on the menu, wherein a plurality of items associated with the menu include the selected at least one item and the remaining items,
    wherein the first graphical object is provided at a first position related to the first set of the items and the second graphical object is provided at a second position related to the second set of the items, and
    wherein, if the selected at least one item is changed, each of the first graphical object and the second graphical object is provided in a changed size at a changed position.

9. The method as claimed in claim 8, wherein the comprises adding a graphic in a direction corresponding to an item which exists in at least one direction with reference to the selected at least one item.

10. The method as claimed in claim 9, wherein when there is an item in a first direction with reference to the selected at least one item, the providing of the graphical objects comprises:
    adding a first graphic in a direction corresponding to the first direction, and
    when there is an item in the first direction and a second direction, respectively, with reference to the selected at least one item, adding the first graphic and a second graphic in a direction corresponding to the first direction and the second direction, respectively.

11. The method as claimed in claim 8, wherein the providing of the graphical objects comprises providing the first graphical object using at least one of size, color, brightness, and degree of transparency and the second graphical object using at least one of size, color, brightness, and degree of transparency.

12. The method as claimed in claim 8,
wherein the displaying of the first graphical object comprises displaying a numeric figure indicating the quantity of the first set of items, and
wherein the displaying of the second graphical object comprises displaying a numeric figure indicating the quantity of the second set of items.

13. The method as claimed in claim 9,
wherein the displaying of the first graphical object comprises displaying an indicative line indicating a location of the first set of items, and
wherein the displaying of the second graphical object comprises displaying an indicative line indicating a location of the second set of items.

14. The method as claimed in claim 8,
wherein the quantity of first set of items includes at least one of a number of the remaining items and a capacity of content of the menu indicated by the remaining items, and
wherein the quantity of the second set of items includes at least one of a number of the remaining items and the capacity of content of the menu indicated by the remaining items.

* * * * *